United States Patent
Nojima et al.

[11] Patent Number: 5,863,855
[45] Date of Patent: Jan. 26, 1999

[54] NITROGEN OXIDE REMOVING CATALYSTS

[75] Inventors: Shigeru Nojima; Kozo Iida, both of Hiroshima-ken, Japan

[73] Assignee: Mitsubishi Jukogyo Kabushiki Kaisha, Tokyo, Japan

[21] Appl. No.: 687,891

[22] Filed: Jul. 26, 1996

[30] Foreign Application Priority Data

Oct. 17, 1995 [JP] Japan .................................. 7-268187

[51] Int. Cl.$^6$ .............................. B01J 35/00; B01J 21/00; B01J 23/00; B01J 29/40
[52] U.S. Cl. .............................. 502/309; 502/71; 502/77; 502/242; 502/247; 502/248; 502/254; 502/255; 502/312; 502/321; 502/322; 502/323; 502/390; 502/351; 502/353; 502/354; 502/355; 502/305; 423/239.1; 423/239.2
[58] Field of Search ..................... 502/439, 309, 502/312, 323, 353, 354, 351, 71, 77, 242, 247, 248, 254, 255, 321, 322, 350, 355, 305; 423/239.1, 239.2

[56] References Cited

U.S. PATENT DOCUMENTS

| 4,294,806 | 10/1981 | Abe et al. | 423/239 |
|---|---|---|---|
| 4,771,026 | 9/1988 | Kainer et al. | 502/210 |
| 4,891,348 | 1/1990 | Imanari et al. | 502/309 |
| 4,892,716 | 1/1990 | Abe et al. | 423/213.7 |
| 4,935,392 | 6/1990 | Kainer et al. | 502/60 |
| 5,064,792 | 11/1991 | Jaras et al. | 502/60 |

FOREIGN PATENT DOCUMENTS

| 0 230641 A1 | 8/1987 | European Pat. Off. . |
|---|---|---|
| 0 260614 A1 | 3/1988 | European Pat. Off. . |
| 0 262311 A1 | 4/1988 | European Pat. Off. . |
| 0 385958 A2 | 9/1990 | European Pat. Off. . |
| 0 398752 A1 | 11/1990 | European Pat. Off. . |
| 0 473396 A1 | 3/1992 | European Pat. Off. . |
| 58-061832A | 4/1983 | Japan . |
| 62-117619A | 8/1987 | Japan . |
| 2108860 | 5/1983 | United Kingdom . |

*Primary Examiner*—Bekir L. Yildirim
*Attorney, Agent, or Firm*—Bell Seltzer Intellectual Property Law Group of Alston & Bird LLP

[57] ABSTRACT

This invention relates to a catalyst for removal of nitrogen oxides in an exhaust gas by adding ammonia to the exhaust gas and hydrogenating catalytically wherein said catalyst is in a two-layered structure comprising a lower layer which is a molded article consisting of components having denitration activity covered with an upper layer which has a abrasion resistance lower than that of the lower layer and which is a coating of particulate components having 2 peaks in its particle size distribution within the range from 0.1 to 50 $\mu$m.

4 Claims, 12 Drawing Sheets

MEDIAN DIAMETER : 3.580 μm
SPECIFIC SURFACE AREA : 74718 cm²/cm³
PARTICLE SIZE % : 10.00 μm : 18.7 %
% PARTICLE SIZE : 90.0 % : 0.270 μm

MEDIAN DIAMETER : 2.503 μm
SPECIFIC SURFACE AREA : 84358 cm²/cm³
PARTICLE SIZE % : 10.00 μm : 13.9%
% PARTICLE SIZE : 90.0% : 0.247 μm

MEDIAN DIAMETER : 5.200 μm
SPECIFIC SURFACE AREA : 70444 cm²/cm³
PARTICLE SIZE % : 10.00 μm : 33.4 %
% PARTICLE SIZE : 90.0 % : 0.267 μm

MEDIAN DIAMETER : 2.534 μm
SPECIFIC SURFACE AREA : 93121 cm²/cm³
PARTICLE SIZE % : 10.00 μm : 22.4%
% PARTICLE SIZE : 90.0% : 0.220 μm

MEDIAN DIAMETER : 3.916 μm
SPECIFIC SURFACE AREA : 79376 cm²/cm³
PARTICLE SIZE % : 10.00 μm : 32.1 %
% PARTICLE SIZE : 90.0 % : 0.242 μm

MEDIAN DIAMETER : 1.400 μm
SPECIFIC SURFACE AREA : 104627 cm$^2$/cm$^3$
PARTICLE SIZE % : 10.00 μm : 7.4%
% PARTICLE SIZE : 90.0% : 0.210 μm

MEDIAN DIAMETER : 1.388 μm
SPECIFIC SURFACE AREA : 105584 cm²/cm³
PARTICLE SIZE % : 10.00 μm : 4.7%
% PARTICLE SIZE : 90.0% : 0.209 μm

MEDIAN DIAMETER : 2.225 μm
SPECIFIC SURFACE AREA : 85390 cm²/cm³
PARTICLE SIZE % : 10.00 μm : 23.1%
% PARTICLE SIZE : 90.0% : 0.246 μm

MEDIAN DIAMETER : 1.096 μm
SPECIFIC SURFACE AREA : 113654 cm²/cm³
PARTICLE SIZE % : 10.00 μm : 3.1 %
% PARTICLE SIZE : 90.0 %  : 0.199 μm

MEDIAN DIAMETER : 0.877 μm
SPECIFIC SURFACE AREA : 115034 cm²/cm³
PARTICLE SIZE % : 10.00 μm : 0.5%
% PARTICLE SIZE : 90.0% : 0.209 μm

MEDIAN DIAMETER : 8.731 μm
SPECIFIC SURFACE AREA : 13788 cm²/cm³
PARTICLE SIZE % : 10.00 μm : 44.0 %
% PARTICLE SIZE : 90.0 % : 2.322 μm

MEDIAN DIAMETER : 0.461 μm
SPECIFIC SURFACE AREA : 177639 cm²/cm³
PARTICLE SIZE % : 10.00 μm : 0.0 %
% PARTICLE SIZE : 90.0 % : 0.162 μm

NITROGEN OXIDE REMOVING CATALYSTS

BACKGROUND OF THE INVENTION

The present invention relates to a catalyst for removing nitrogen oxides contained in a combustion exhaust gas such as a boiler exhaust gas, especially nitrogen oxides contained in coal combustion exhaust gas.

As a method of removing NOx generated from boilers and various combustion furnaces for the purpose of controlling air pollution, selective catalytic hydrogenation in which a catalyst is used to effect catalytic decomposition into nitrogen and oxygen while adding ammonia gas to an exhaust gas is applied widely to gases, oils and coal.

In the denitration method mentioned above, especially when employing current catalysts applied to the coal combustion exhaust gas, a problem that deposition of calcium and arsenic dusts contained in the exhaust gas causes time course reduction in the catalyst performance is experienced.

The reduction in performance as mentioned above causes disadvantage of frequent replacement of a large amount of catalyst, and accordingly a catalyst having a higher and long lasting performance when compared with the current catalysts is desired.

It is known that the causes for the degradation of the catalysts is the deposition of compounds contained in the dust of the exhaust gas such as calcium and arsenic onto the surface of the catalyst, which results in masking of catalytic active metals and preventing the reactive gases such as NOx and $NH_3$ from diffusing into the internal area of the catalyst. Since the dust is deposited in a major amount within the depth of about 50 μm from the surface of the catalyst, the durability of the catalyst is considered to be improved by means of coating a component which is worn out gradually as the dust is deposited on the catalyst surface whereby exposing a new surface sequentially.

Accordingly, we invented a two-layered denitration catalyst comprising a lattice catalyst layer as a lower layer covered with a coating as an upper layer having a abrasion resistance against dusts which is lower than that of the lower layer (Unexamined Japanese Patent Application 7-120997). However, since the abrasion resistance of the upper layer coating became extremely low with a certain particle size distribution and the upper layer is worn out instantly when the two-layered catalyst is exposed actually to an exhaust gas, the catalyst suffered from the disadvantage that the dust deposition is not satisfactorily be suppressed. Thus, in such two-layered catalyst, it is important that the abrasion resistance of the upper coating layer should appropriately be high but lower than that of the lower lattice catalyst layer.

SUMMARY OF THE INVENTION

In view of the above, the present invention is intended to provide a catalyst for removal of nitrogen oxides capable of meeting the requirements described above.

We made efforts to achieve a method by which the abrasion resistance of the coating layer of the two-layer structure catalyst, and as a result we found that the particle size distribution of the particulate comprised in the upper coating layer was related closely to the abrasion resistance. Especially based on the findings that when the particle in the coating layer has the particle size distribution profile having two peaks within the range from 0.1 to 50 μm an abrasion resistance suitable for a catalyst for the treatment of coal combustion exhaust gas and the like is achieved, the present invention has been established.

Accordingly, the present invention provides a catalyst for removal of nitrogen oxides in an exhaust gas by adding ammonia to the exhaust gas and hydrogenating catalytically wherein said catalyst is in a two-layered structure comprising a lower layer which is a molded article consisting of components having denitration activity covered with an upper layer which has a abrasion resistance lower than that of the lower layer and which is a coating of particulate components having 2 peaks in its particle size distribution within the range from 0.1 to 50 μm. The present invention further provides a catalyst for removal of nitrogen oxides mentioned in the above wherein said molded article as the lower layer having the denitration activity and said coated upper layer component contain at least one active component selected from the group consisting of titanium oxide, vanadium oxide, tungsten oxide and molybdenum oxide. The present invention further provides a catalyst for removal of nitrogen oxides mentioned in the above wherein the upper layer component is a component containing at least one component selected from the group consisting of titania, silica, alumina, zirconia, ZSM-5 silicalite and metallosilicate.

In a two-layer structure catalyst having a molded article of a denitration catalyst over which a component having two-phase particle distribution profile is coated, the coating layer maintains sufficient binding property even when exposed to an actual coal combustion exhaust gas, whereby enabling prevention of instant wear out, resulting in highly active and long lasting catalytic performance. Thus, since the upper layer has an abrasion resistance lower than that of the lower layer, calcium and arsenic compounds deposited onto the surface of the upper layer can readily be removed as a result of abrasion of the upper layer surface to expose a new surface, whereby maintaining the catalytic activity. Nevertheless, in order to prevent the upper layer from being worn out completely at once, it is preferable that the upper layer component have an abrasion resistance which is 40 to 80% based on that of the lower layer component, and with such abrasion resistance the durability of the catalyst can further be enhanced. On the other hand, if the upper layer is the single constituent of the catalyst, a false operation causing the entire layer to be worn out results in a problem of a complete absence of the catalytic performance. Thus, the two layer structure comprising the lower layer having a higher abrasion resistance is employed to ensure the denitration performance.

DESCRIPTION OF THE PREFERRED EMBODIMENTS

Figure 1:
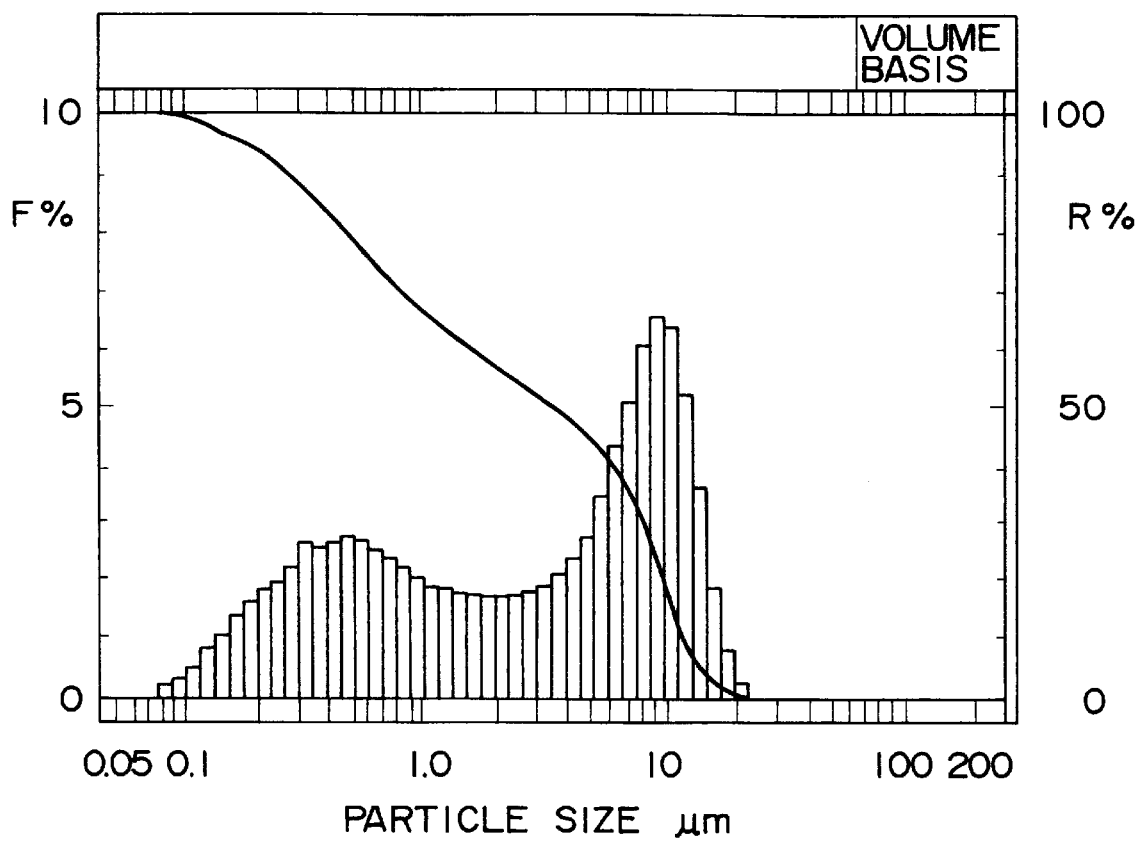
FIG. 1 shows the particle size distribution of the upper layer coating component of Catalyst 1 according to the present invention.
Figure 2:
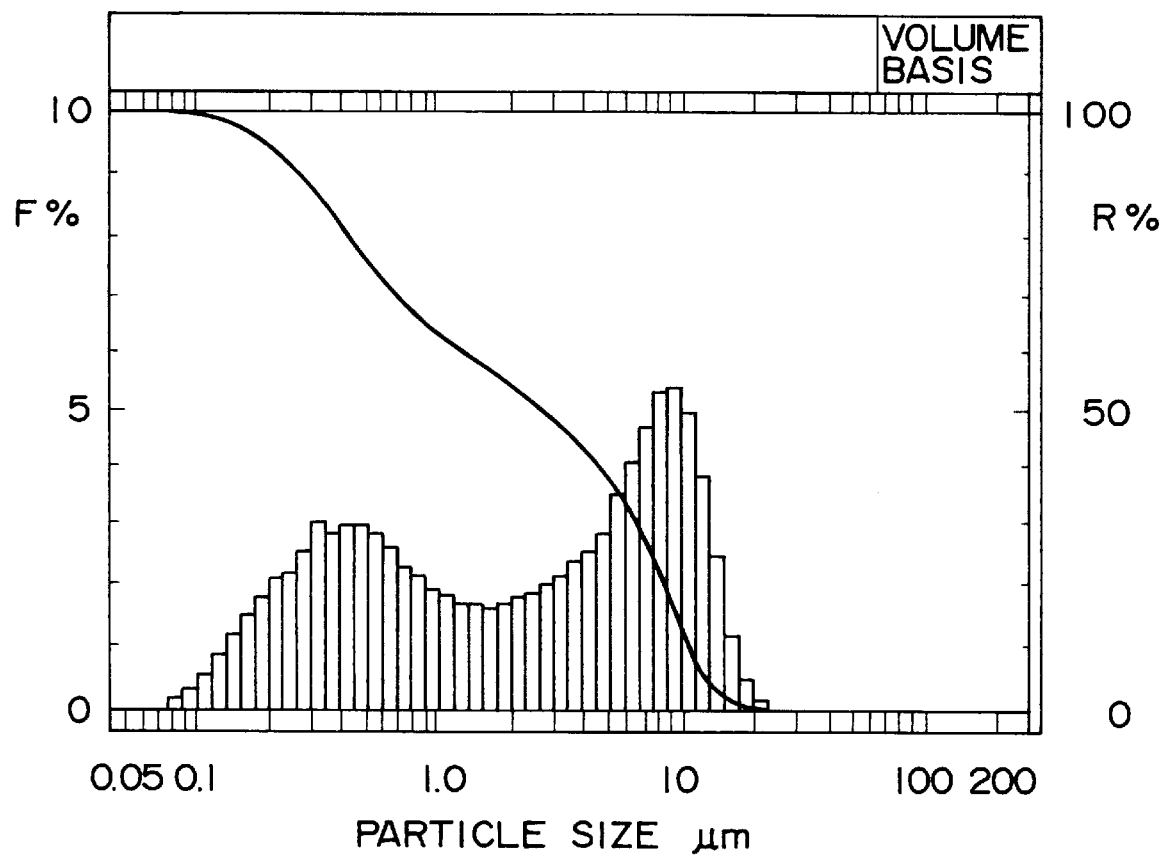
FIG. 2 shows the particle size distribution of the upper layer coating component of Catalyst 2 according to the present invention.
Figure 3:
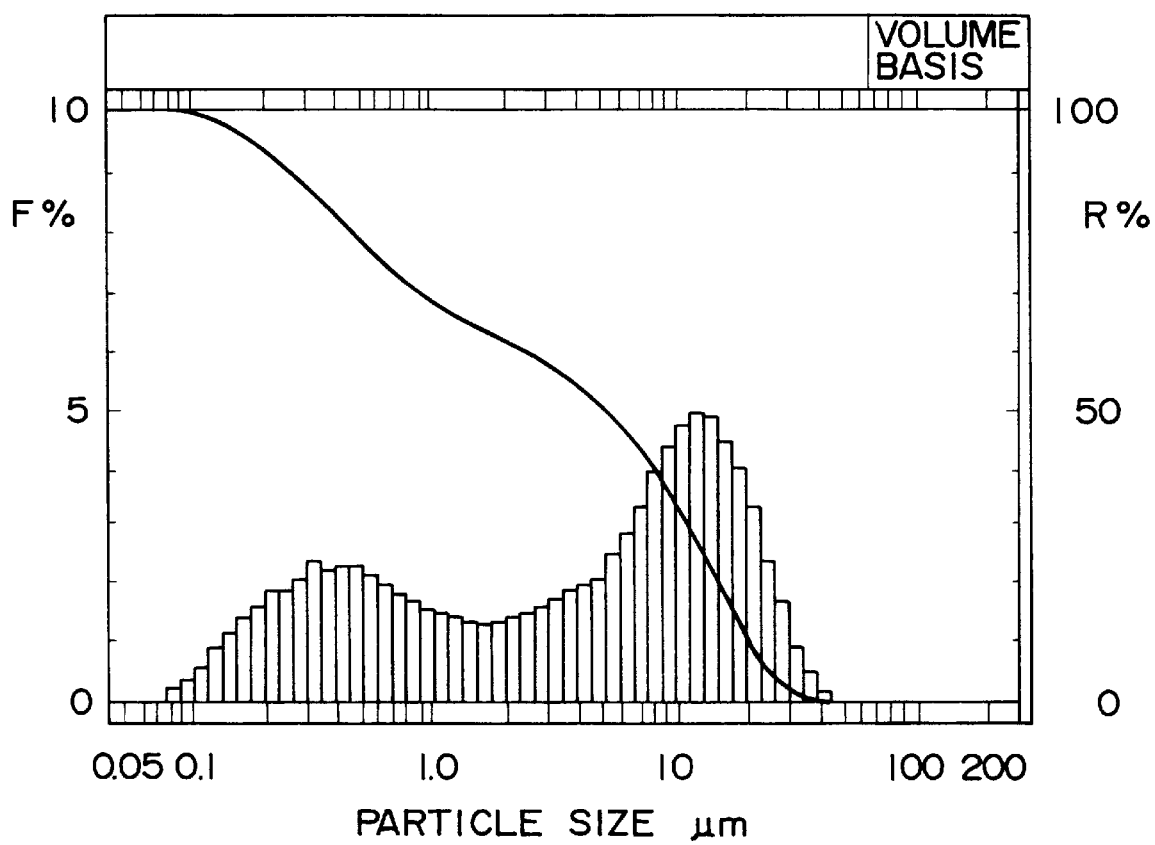
FIG. 3 shows the particle size distribution of the upper layer coating component of Catalyst 3 according to the present invention.
Figure 4:
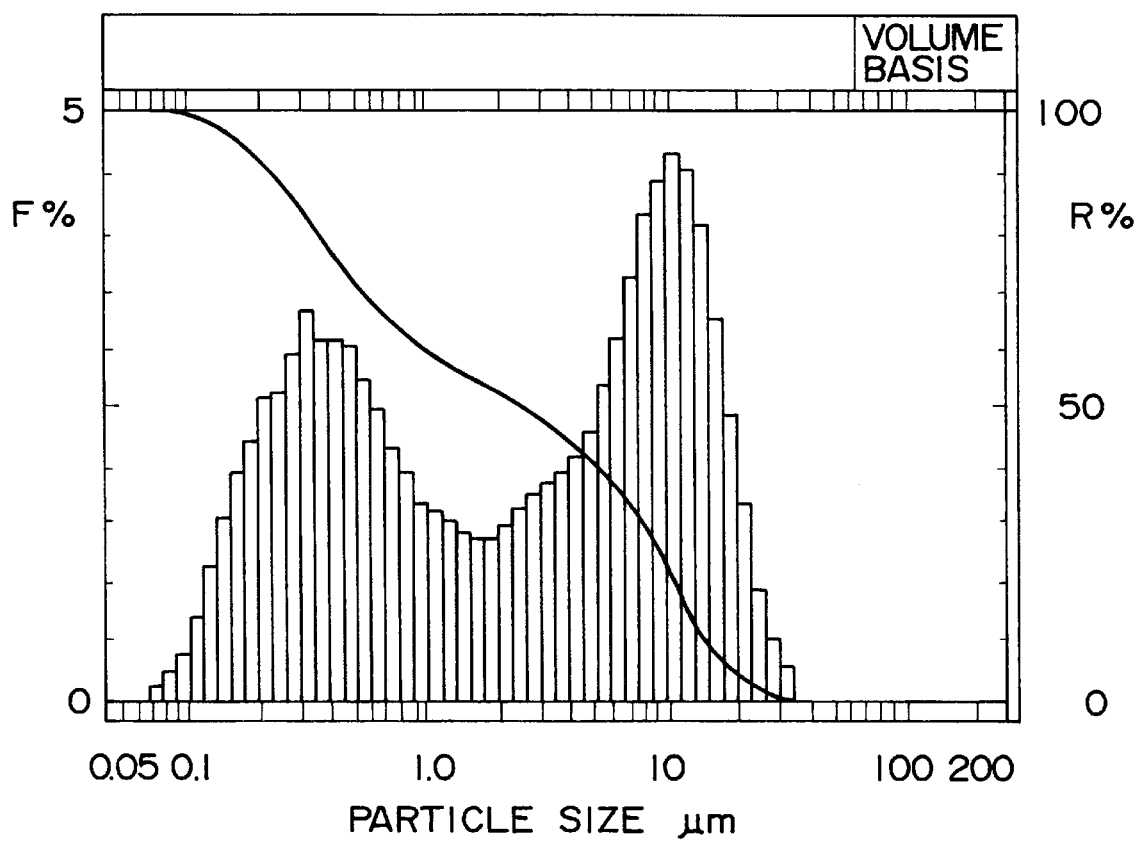
FIG. 4 shows the particle size distribution of the upper layer coating component of Catalyst 4 according to the present invention.
Figure 5:
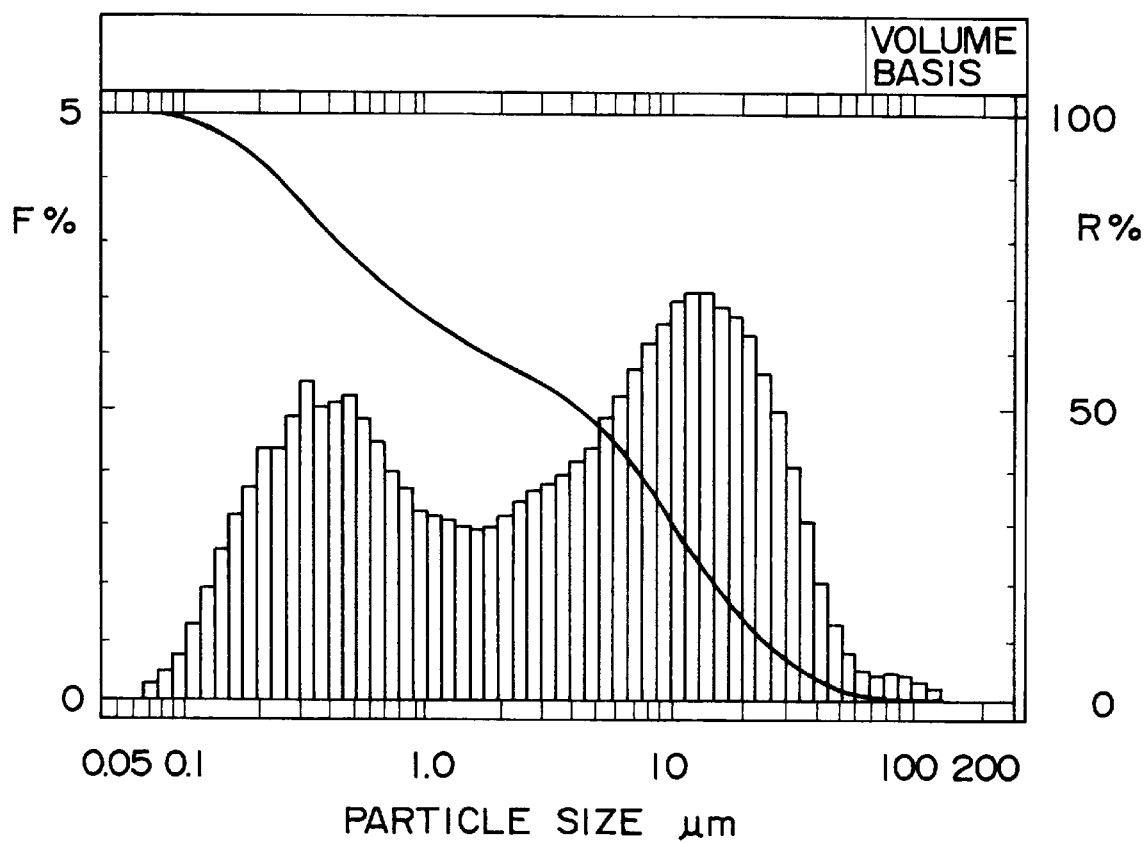
FIG. 5 shows the particle size distribution of the upper layer coating component of Catalyst 5 according to the present invention.

In the present catalyst, the molded article as the lower layer having the denitration activity and the coated upper layer component may be any of those having general composition of a denitration catalyst. For example, a component consisting of 100 parts by weight of $TiO_2$, 0.2 to 15 parts by weight of V (as $V_2O_5$), 0 to 25 parts by weight of W (as $WO_3$) and 0 to 25 parts by weight of Mo ($MoO_3$).

The upper layer component placed on the lower layer having the denitration activity in the present catalyst, when selected from the group consisting of titania, silica, alumina, zirconia, ZSM-5, silicalite and metallosilicate, is coated preferably in an amount of 10 to 300 g/m² per gas contact area of the molded article of the lower layer catalyst. Among the components employed in the upper layer, ZSM-5 is the tradename of a zeolite supplied from Mobil Oil, silicalite is a silicate consisting exclusively of pentasil type Si and O, and metallosilicate is a crystalline silicate having a X ray diffraction pattern indicated in Table 1 shown below and a chemical formula, as represented by the molar ratios of the oxides as dehydrated, of $(1\pm0.8)R_2O \cdot [aM_2O_3 \cdot bM'O \cdot cAl_2O_3] \cdot ySiO2$ wherein R denotes an alkaline metal ion and/or hydrogen ion, M denotes at least one elemental ion selected from the group consisting of VIII group elements, rare earth elements, titanium, vanadium, chromium, niobium, antimony and gallium, M' denotes an alkaline earth metal ion such as magnesium, calcium, strontium, barium ions, and a >0, 20>b≧0, a+c=1, 3000 >y/11. ZMS-5, silicalite, metallosilicate are crystalline silicates having $SiO_2$ as a major component, and have micropores of about 6 Angstrom. Characteristically, these substances are difficult to be inactivated with heavy metals contained in coal combustion exhaust gas such as $As_2O_3$, since $As_2O_3$ in a gas phase is in the form of $As_4O_6$ having a molecular size of about 7 Angstrom which cannot diffuse and penetrate into the micropores in the substances mentioned above whereby allowing the active reaction sites in the micropores to be remain available.

TABLE 1

| Lattice surface distance (d value) | Relative resistance |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very strong,
S: Strong,
M: Moderate,
W: Weak, (X ray source: Cu Kα)

In an upper coating part, pellets obtained by milling the honeycomb molded article employed in the lower layer and wasted catalysts may be employed. In an example, coarse pellets having a size of 10 mm or less and water are placed in a ball mill and subjected to wet ball mill grinding process to obtain finely divided pellets, which may be used. Thus, the grinding process is conducted at a certain rotation rate, and various types of the particles having various particle size distributions are obtained by varying the grinding time, and then 2 types of the particles having appropriate particle sizes are admixed to obtain the upper layer coating component. For example, by means of wet grinding for 1 to 96 hours at 100 rpm using a wet ball mill container having a net content of about 8 liters, an upper layer component having two peaks within the range from 0.1 to 50 μm can be obtained. Thus, the particle obtained by grinding the honeycomb molded article (secondary particle) has an average particle size of 5 to 20 μm, and is constructed as an aggregation of a primary particle having an average particle size of 0.1 to 1 μm. By means of grinding the secondary particle, the secondary particle is partially divided into the primary particle, yielding a population of the particles having two peaks one being 0.1 to 1 μm and the other being 5 to 20 μm.

The particle size distribution of titania, silica, alumina and zirconia may also be controlled by the method described above, while the optimum condition should be selected for a particular device employed because the milling condition varies depending on the specification and parameters of the milling device.

Since the particle sizes of silicalite, ZSM-5 and metallosilicate are difficult to be controlled by grinding, it is required that 2 types of particles having different particle sizes have previously been prepared and then they are mixed to obtain a population having two peaks in the particle size distribution. The particle sizes of the crystal of silicalite, ZSM-5 and metallosilicate vary depending on pH of slurry and alkaline earth metal being added or not during the step of hydrothermal synthesis. Generally, a greater particle size of the crystal can be obtained by adjusting pH of the slurry at 10 to 11 and adding an alkaline earth metal.

Although the reason for an improved abrasion resistance of a population of the particles having two peaks in its particle size distribution is not so clear, it can be assumed that uniform packing of the particles having different sizes may enhance the binding strength between the particles.

Working Examples

The advantage of the present invention is further described below in the examples of the inventive catalysts for removing nitrogen oxides.

(Example 1)

A lattice honeycomb catalyst containing $TiO_2$ as the major component together with 0.5 wt % of $V_2O_5$ and 8 wt % of $WO_3$ and having the pitch of 7.4 mm and the wall thickness of 1.1 mm was employed as the lower layer molded article. This honeycomb catalyst was milled into a powder having a particle size of 5 mm or smaller, which was then immersed in ammonium m-vanadate dissolved in methylamine and evaporated to dryness and then sintered at 500° C. for 5 hours to obtain a powder containing 3 wt % of $V_2O_5$. 1500 g of this powder and 5000 g of water were placed in a ball mill having the capacity of 8 liters and subjected to wet blend milling for 8 hours using alumina balls (25 mm in diameter, 4.2 kg). After milling, the particle size distribution of the powder was determined using laser diffraction/scattering method (HORIBA SEISAKUSHO model LA-700) at the refractive index of 1.3. The results of the determination are shown in FIG. 1.

In the footnote of FIG. 1, "median diameter" (center diameter) represents the particle size corresponding to 50% of cumulative distribution (meaning the average particle size), "particle size %" indicates that the particle size of 10.00 μm comprises 18.7% or more, and "% particle size" indicates that 90% of the particle had a particle size of 0.270 μm or greater, and the curve in FIG. 1 represents the cumulative distribution of the particle. The same meanings are applied to the footnote of the subsequent figures.

A slurry containing this powder was added to water to adjust the slurry concentration at 20 wt %, and then coated onto the lower layer molded article at the coating rate of 100 g/m² per honeycomb outer surface area. The two layer structure catalyst was designated as Catalyst 1.

(Example 2)

The honeycomb catalyst pellets employed as the coating powder in Example 1 was replaced with the commercial pellets (3 mm in diameter×3mm in length), namely, titania (SAKAI KAGAKU), silica (FUJI DIVISION) and alumina (SUMITOMO CHEMICAL), zirconia (NIKKI KAGAKU), each of which was subjected to the wet ball mill grinding for 8 hours similarly as in Example 1. The particle size distribution after milling was determined similarly as in Example 1, and the results of the determination of the samples are shown in FIGS. 2 to 5. These powders were coated similarly as in Example 1 at the coating rate of 40 g/m² per honeycomb outer surface area, and the two layer structure catalysts thus obtained were designated as Catalyst 2 to Catalyst 5.

(Example 3)

The honeycomb catalyst pellets employed as the coating powder in Example 1 was replaced with the material prepared as follows.

Figure 6:
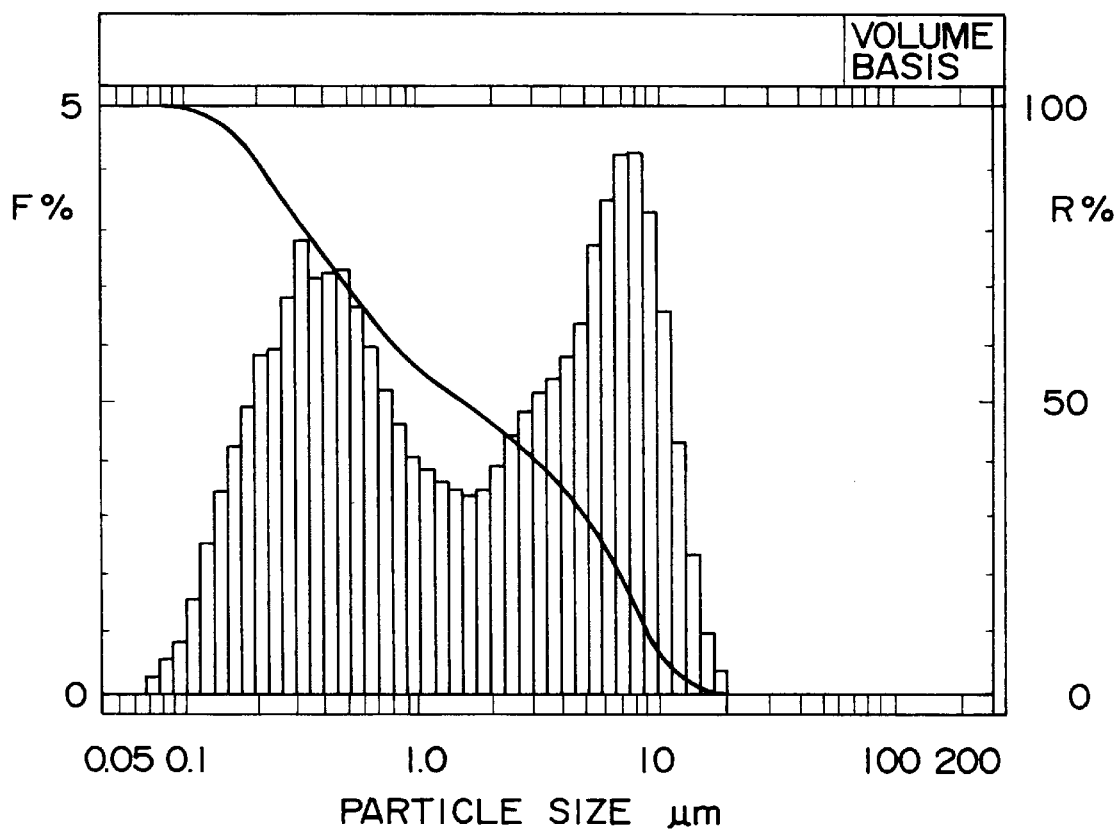
FIG. 6 shows the particle size distribution of the upper layer coating component of Catalyst 6 according to the present invention.
Figure 7:
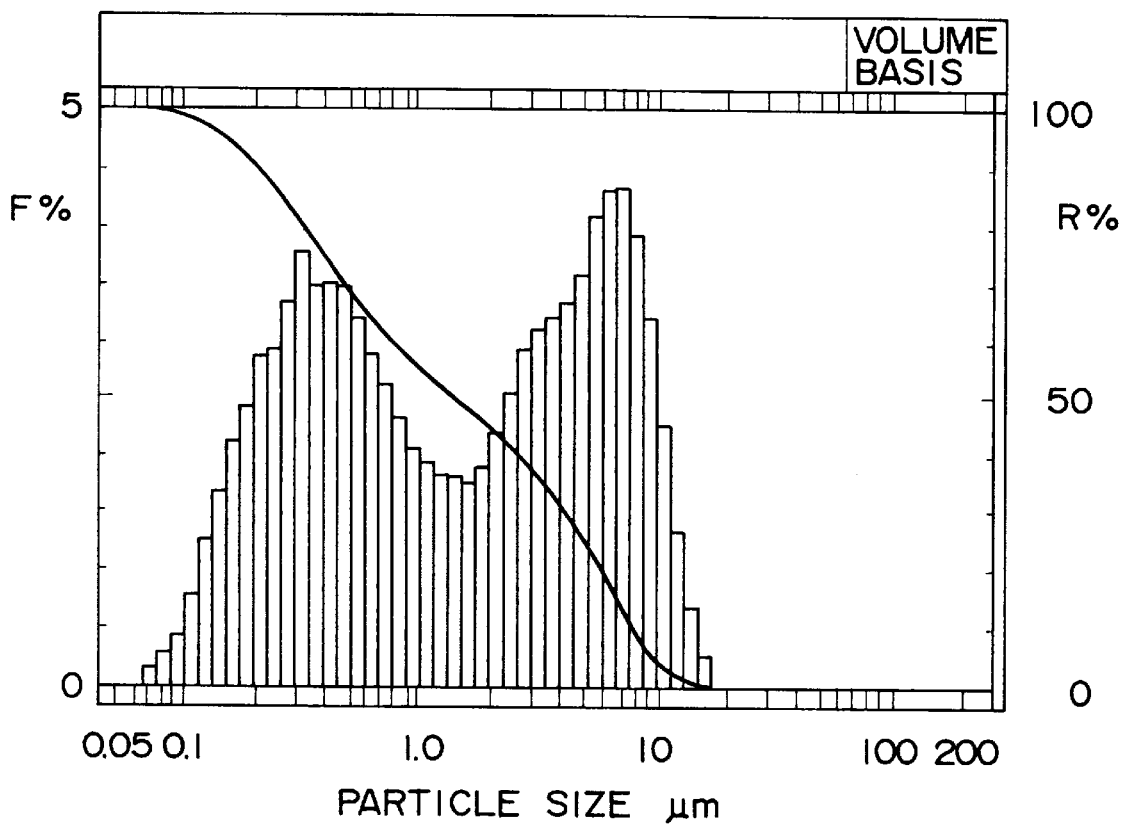
FIG. 7 shows the particle size distribution of the upper layer coating component of Catalyst 7 according to the present invention.
Figure 8:
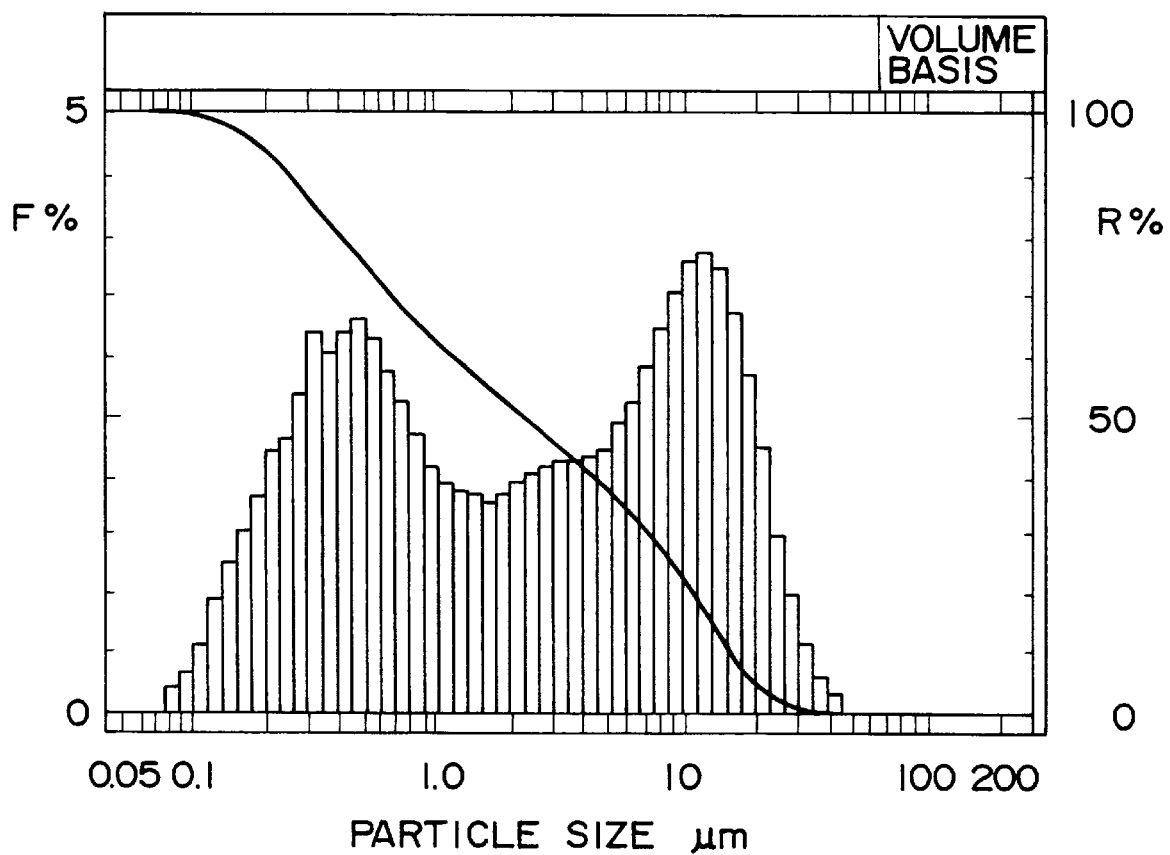
FIG. 8 shows the particle size distribution of the upper layer coating component of Catalyst 8 according to the present invention.

Silicalite, ZSM-5, metallosilicate {composition formula: $H_2O\ [0.2\ Fe_2O_3 \cdot 0.8Al_2O_3 \cdot 0.2CaO] \cdot 25SiO_2$} were subjected to hydrothermal synthesis to synthesize two types of the powders having the average particle sizes of about 1 μm and about 10 μm, and the powders thus obtained were mixed in equal amounts and admixed with water to obtain a slurry, which was then subjected to the wet ball mill grinding for 2 hours similarly as in Example 1. The particle size distributions of these samples were shown in FIG. 6 to FIG. 8. These powders were coated similarly as in Example 1 at the coatihg rate of 40 g/m² per honeycomb outer surface area, and the two layer structure catalysts thus obtained were designated as Catalyst 6 to Catalyst 8.

(Example 4)

Figure 9:
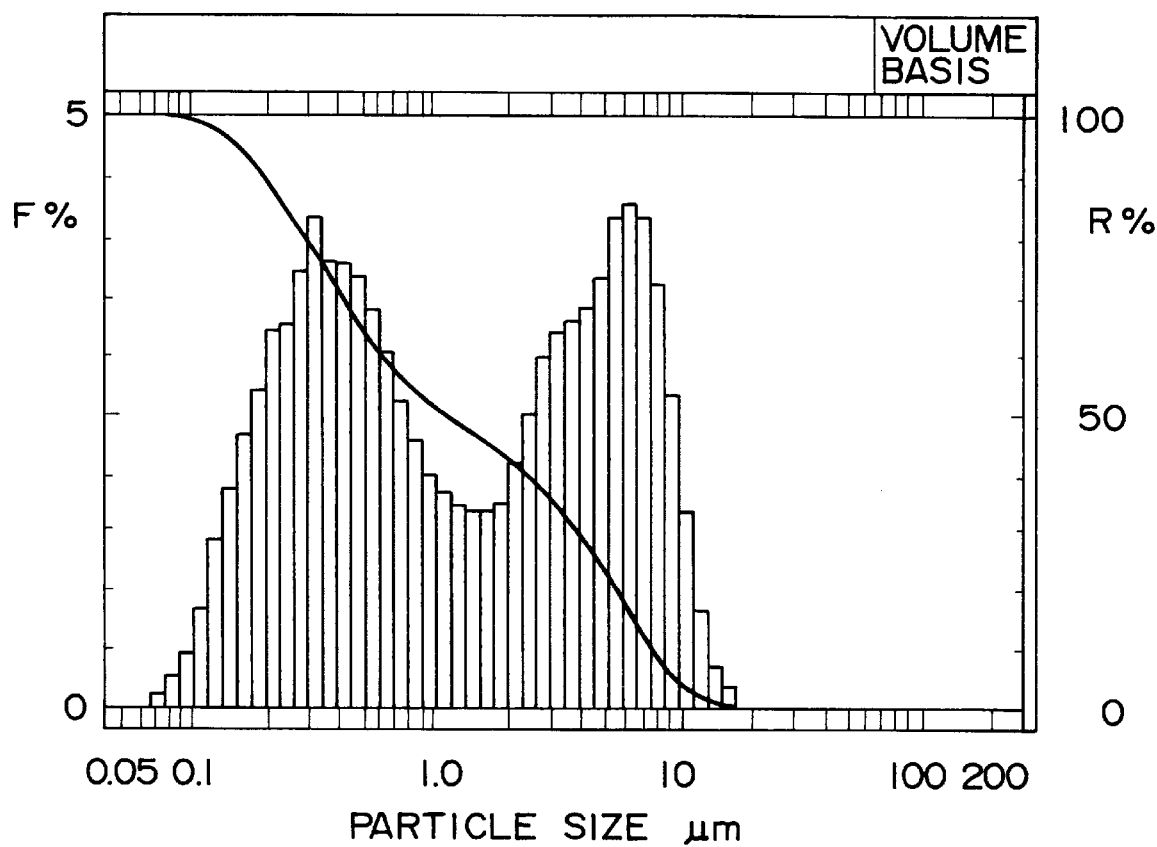
FIG. 9 shows the particle size distribution of the upper layer coating component of Catalyst 9 according to the present invention.
Figure 10:
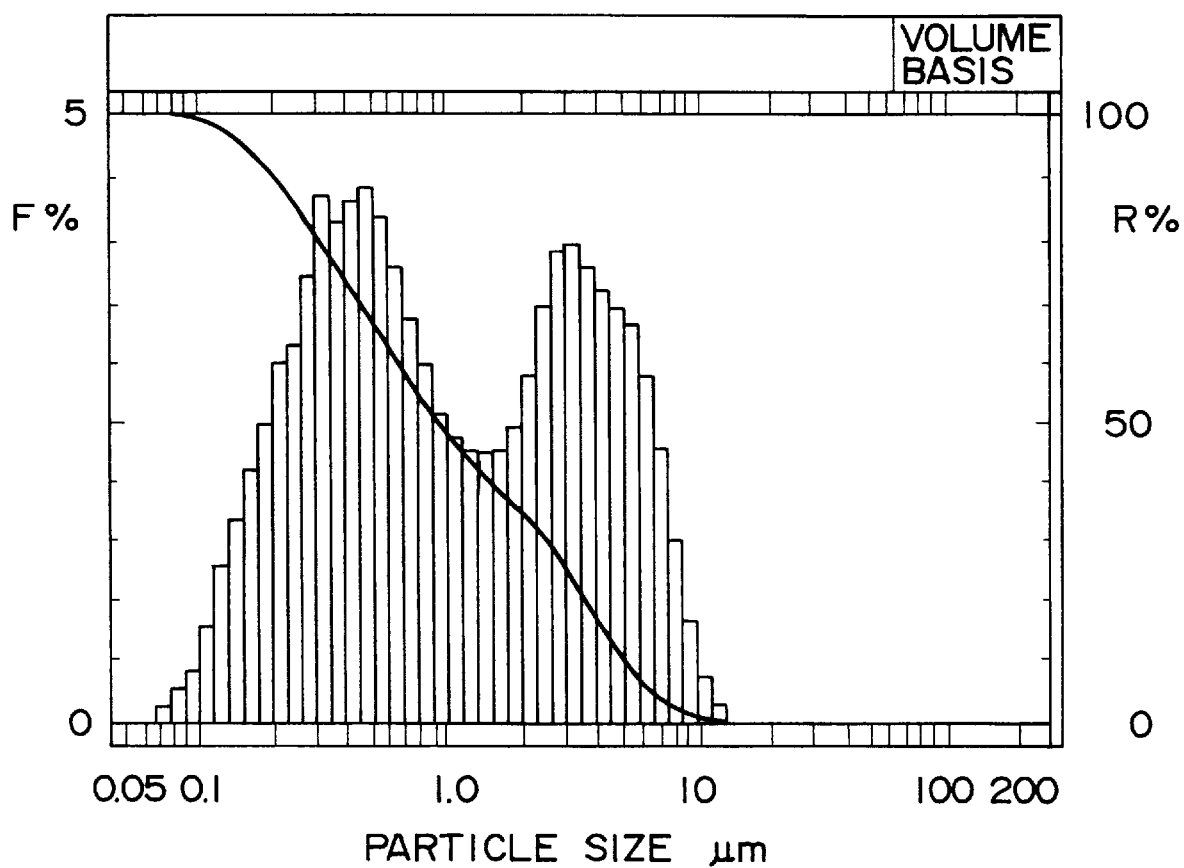
FIG. 10 shows the particle size distribution of the upper layer coating component of Catalyst 10 according to the present invention.

The honeycomb catalyst pellets were subjected to the wet ball mill grinding for 16 and 24 hours similarly as in Example 1. The particle size distributions of the powders after milling are shown in FIG. 9 and FIG. 10. These powders were coated similarly as in Example 1 at the coating rate of 100 g/m² per honeycomb outer surface area, and the two layer structure catalysts thus obtained were designated as Catalysts 9 and 10.

In addition, the powder shown in FIG. 1 in Example 1 was coated at the coating rate of 50 g/m² and 150 g/m² per honeycomb outer surface area, and the two layer structure catalysts thus obtained were designated as Catalysts 11 and 12.

(Comparative 1)

Figure 11:
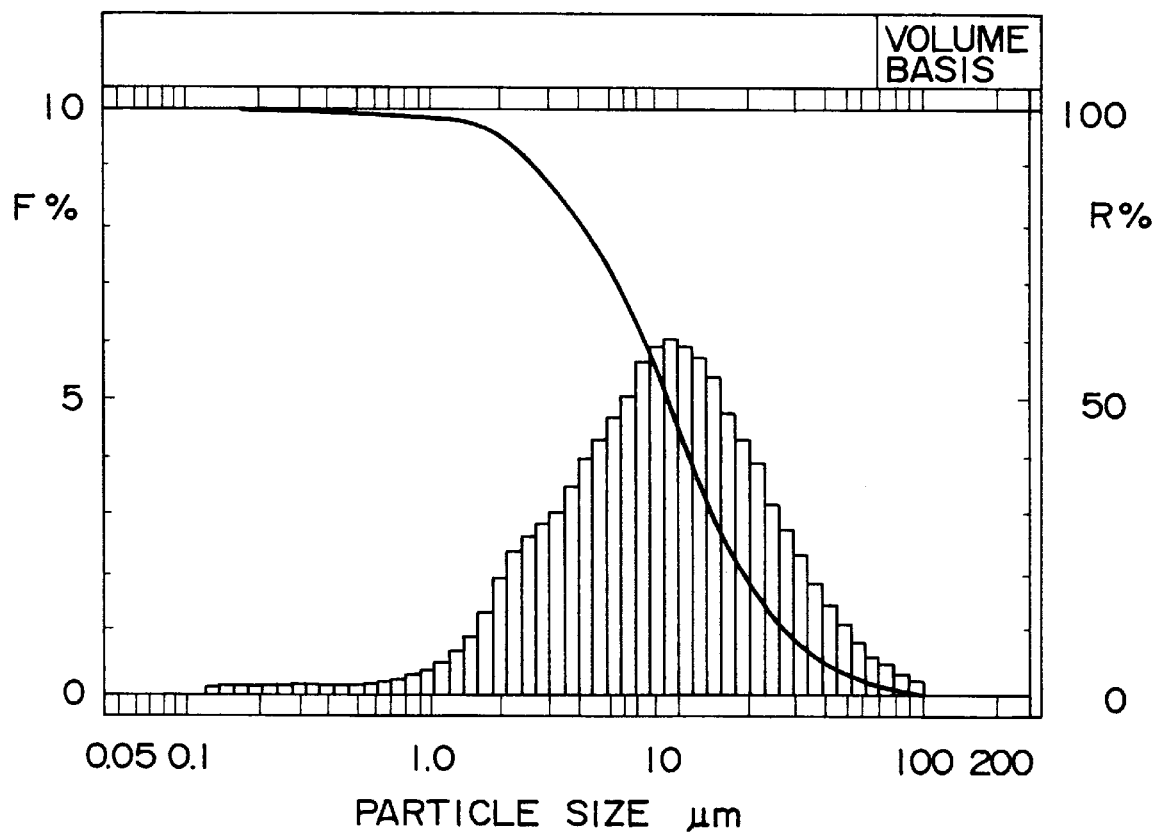
FIG. 11 shows the particle size distribution of the upper layer coating component of Comparative catalyst 1 according to the present invention.
Figure 12:
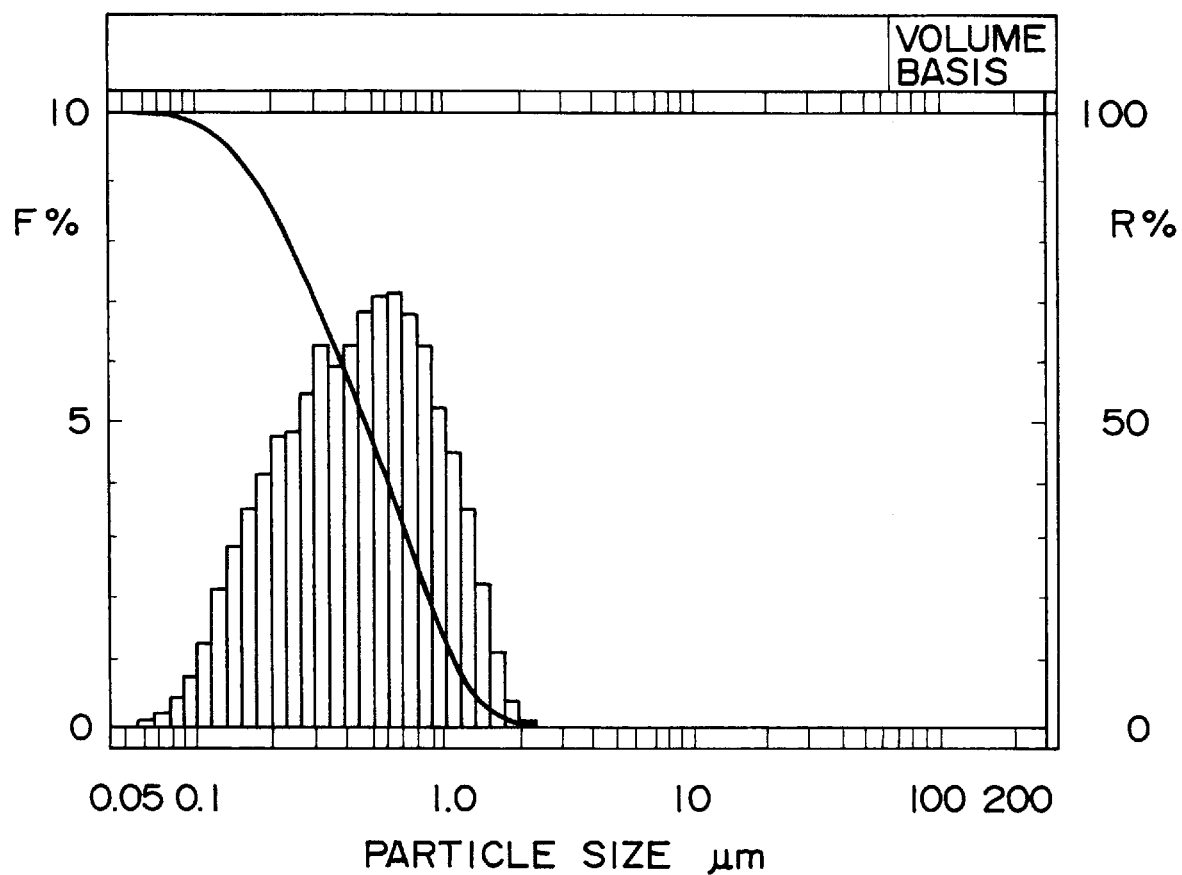
FIG. 12 shows the particle size distribution of the upper layer coating component of Comparative catalyst 2 according to the present invention.

The honeycomb catalyst pellets were subjected to the wet ball mill grinding for 10 minutes and 144 hours similarly as in Example 1. The particle size distributions of the powders after milling are shown in FIG. 11 and FIG. 12. These powders were coated similarly as in Example 1 at the coating rate of 100 g/m² per honeycomb outer surface area, and the two layer structure catalysts thus obtained were designated as Comparative catalysts 1 and 2. Comparative catalyst 3 was further provided which was a 7.4 mm pitch lattice catalyst and had no upper coating layer.

(Experiment 1)

Catalyst 1 to 11 and Comparative catalyst 1 to 3 were exposed to a coal combustion exhaust gas containing 15 g/Nm³ of dusts (average linear velocity: 2.2 Nm/s, average temperature: 390° C.) and the denitration activity and abrasion rate were determined under the condition shown in Table 2 before and 15000 hours after the exposure. The results are shown in Table 3.

TABLE 2

| Catalyst shape | 6 pores and 7 pores 756 mmL (7.4 mm pitch) |
|---|---|
| Temperature | 380 C.° |
| Gas Flow rate | 19.5 Nm³/h |
| Linear velocity | 2.3 Nm/s |
| GHSV | 11.200 h⁻¹ |
| Gas composition | |
| NO | 150 ppm |
| $NH_3$ | 150 ppm |
| $SO_2$ | 800 ppm |
| $CO_2$ | 10% |
| $H_2O$ | 10% |
| $N_2$ | Balance |

Note: GHSV stands for Gas Hourly Space Velocity and means gas velocity in a cylinder cavity. (Gas feed velocity per catalyst volume = $(m^3/h)/m^3 = h^{-1}$)

The denitration activity (%) and abrasion rate (%) shown in Table 3 were calculated as follows. (1) Denitration activity (%)=(1−((outlet NOx conc.*)/(inlet Nox conc.)))×100, *: NOx conc.=($NO+NO_2$) conc. (2) Abrasion rate (%)=(1−(weight of coating after 15,000 hours)/(initial coating weight)))×100

TABLE 3

| | Denitration activity (%) | | |
|---|---|---|---|
| | Initial | After 15,000 hours | Abrasion rate of coating after 15,000 hours (%) |
| Catalyst 1 | 89 | 87 | 50 |
| Catalyst 2 | 76 | 76 | 60 |
| Catalyst 3 | 77 | 76 | 70 |
| Catalyst 4 | 78 | 78 | 65 |
| Catalyst 5 | 77 | 77 | 70 |
| Catalyst 6 | 77 | 77 | 70 |
| Catalyst 7 | 78 | 77 | 70 |
| Catalyst 8 | 77 | 76 | 75 |
| Catalyst 9 | 89 | 88 | 40 |
| Catalyst 10 | 89 | 87 | 35 |
| Catalyst 11 | 88 | 86 | 50 |
| Catalyst 12 | 90 | 88 | 50 |
| Comparative catalyst 1 | 89 | 73 | 100 |
| Comparative catalyst 2 | 89 | 73 | 100 |
| Comparative catalyst 3 | 80 | 65 | — |

Since the conditions of milling for each powder in examples shown above vary depending on the specifications of the devices, the values indicated are not applicable to all cases, and it is essential that the powder has the particle size distribution profile having two peaks.

According to the invention, a two layer structure catalyst coated with the component having two peaks within the range from 0.1 to 50 μm in its particle size distribution (Catalyst 1 to 12) undergoes no instant wear out of the coating layer by means of the dust in a coal combustion exhaust gas but is abraded to a suitable level as the dust deposits, whereby maintaining a new surface of the catalyst continuously and providing a long lasting performance.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

We claim:

1. A catalyst for removal of nitrogen oxides in an exhaust gas by adding ammonia to the exhaust gas and hydrogenating catalytically wherein said catalyst is in a two-layered structure comprising a lower layer which is a molded article consisting of components having denitration activity covered with an upper layer which has a abrasion resistance lower than that of the lower layer, said upper layer consisting essentially of a mixture of two groups of particulate components, said groups each having a different peak in particle size distribution and each of said peaks being in the range of about 0.1 to about 50 μm.

2. A catalyst for removal of nitrogen oxides according to claim 1 wherein said molded article as the lower layer having the denitration activity and said coated upper layer component contain at least one active component selected from the group consisting of titanium oxide, vanadium oxide, tungsten oxide and molybdenum oxide.

3. A catalyst for removal of nitrogen oxides according to claim 1 or 2 wherein the upper layer comprises at least one component selected from the group consisting of titania, silica, alumina, zirconia, ZSM-5, silicalite and metallosilicate.

4. A catalyst for removal of nitrogen oxides according to claim 3 wherein the amount of the coating of the upper layer component is 10 to 300 g/m$^2$ per gas contact area of the lower catalyst molded article.

* * * * *